US010193781B2

(12) United States Patent
Han et al.

(10) Patent No.: US 10,193,781 B2
(45) Date of Patent: Jan. 29, 2019

(54) FACILITATION OF MULTIPATH TRANSMISSION CONTROL PROTOCOLS

(71) Applicant: AT&T Intellectual Property I, L.P., Atlanta, GA (US)

(72) Inventors: Bo Han, Bridgewater, NJ (US); Lusheng Ji, Randolph, NJ (US); Vijay Gopalakrishnan, Edison, NJ (US); Feng Qian, Bloomington, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 294 days.

(21) Appl. No.: 15/099,207

(22) Filed: Apr. 14, 2016

(65) Prior Publication Data
US 2017/0302549 A1    Oct. 19, 2017

(51) Int. Cl.
| G06F 15/173 | (2006.01) |
| H04L 12/26 | (2006.01) |
| H04L 29/08 | (2006.01) |
| H04W 76/10 | (2018.01) |

(52) U.S. Cl.
CPC .......... *H04L 43/0876* (2013.01); *H04L 67/02* (2013.01); *H04L 67/303* (2013.01); *H04W 76/10* (2018.02)

(58) Field of Classification Search
CPC ... H04L 43/0876; H04L 67/303; H04W 76/10
See application file for complete search history.

(56) References Cited

U.S. PATENT DOCUMENTS

| 8,964,757 B2 | 2/2015 | Watson et al. |
| 9,491,098 B1 * | 11/2016 | Wilson ................. H04L 47/125 |
| 2005/0086363 A1 | 4/2005 | Ji |
| 2005/0213503 A1 | 9/2005 | Guo et al. |
| 2007/0002874 A1 | 1/2007 | Kang et al. |
| 2011/0296006 A1 | 12/2011 | Krishnaswamy et al. |
| 2013/0077501 A1 | 3/2013 | Krishnaswamy et al. |

(Continued)

FOREIGN PATENT DOCUMENTS

| CN | 103346963 A | 10/2013 |
| WO | 2015030641 A1 | 3/2015 |

OTHER PUBLICATIONS

Office Action dated Sep. 12, 2017 for U.S. Appl. No. 15/086,613, 24 pages.

(Continued)

*Primary Examiner* — Arvin Eskandarnia
*Assistant Examiner* — Austin J Moreau
(74) *Attorney, Agent, or Firm* — Amin, Turocy & Watson, LLP

(57) ABSTRACT

A more efficient network can be achieved by using a cost-benefit analysis determined by mobile device, wireless network, and server device functionality. The cost-benefit analysis can be used to determine whether SPTCP or MPTCP or any combination of the two is used. The mobile device can generate the cost-benefit analysis based on known and unknown device and network metrics and send the cost-benefit analysis to the server device. The server device can then comply with the cost-benefit analysis and then send requested web site data via SPTCP and/or MPTCP in accordance with the cost-benefit analysis.

20 Claims, 10 Drawing Sheets

(56) References Cited

U.S. PATENT DOCUMENTS

| | | | |
|---|---|---|---|
| 2013/0095806 A1* | 4/2013 | Salkintzis | H04W 72/1215 |
| | | | 455/414.3 |
| 2013/0279331 A1 | 10/2013 | Pluntke et al. | |
| 2014/0355446 A1 | 12/2014 | Altman | |
| 2014/0362765 A1 | 12/2014 | Biswas et al. | |
| 2015/0092573 A1 | 4/2015 | Zhang et al. | |
| 2015/0215225 A1 | 7/2015 | Mildh et al. | |
| 2015/0215345 A1 | 7/2015 | Agarwal | |
| 2015/0215839 A1 | 7/2015 | Johansson et al. | |
| 2015/0215922 A1 | 7/2015 | Bahk et al. | |
| 2015/0237525 A1 | 8/2015 | Mildh et al. | |
| 2015/0245409 A1* | 8/2015 | Medapalli | H04W 76/20 |
| | | | 370/329 |
| 2015/0271725 A1 | 9/2015 | Lee et al. | |
| 2015/0281367 A1 | 10/2015 | Nygren et al. | |
| 2015/0282219 A1 | 10/2015 | Kweon et al. | |
| 2015/0295782 A1 | 10/2015 | Ramamoorthy et al. | |
| 2015/0312383 A1 | 10/2015 | Roeland et al. | |
| 2015/0381455 A1* | 12/2015 | Martinsen | H04L 65/608 |
| | | | 370/252 |
| 2016/0007295 A1* | 1/2016 | Kahn | H04W 52/0251 |
| | | | 370/311 |
| 2017/0163775 A1* | 6/2017 | Ravi | H04L 45/24 |
| 2017/0171098 A1 | 6/2017 | Le et al. | |
| 2017/0188407 A1 | 6/2017 | Zee et al. | |
| 2017/0208104 A1 | 7/2017 | Wei et al. | |
| 2017/0223601 A1* | 8/2017 | Egner | H04W 40/10 |
| 2017/0230200 A1* | 8/2017 | Hariharan | H04L 12/4641 |

OTHER PUBLICATIONS

Nika, et al., "Energy and Performance of Smartphone Radio Bundling in Outdoor Environments", Proceedings of the 24th International Conference on World Wide Web, May 2015, ACM, 11 pages.

Han, et al., "An Anatomy of Mobile Web Performance Over Multipath TCP", 2015, ACM, 7 pages.

Raiciu, et al., "How Hard Can It Be? Designing and Implementing a Deployable Multipath TCP", Proceedings of the 9th USENIX Conference on Networked Systems Design and Implementation, 2012, USENIX Association, 14 pages.

Paasch, et al., "Experimental Evaluation of Multipath TCP Schedulers", Proceedings of the 2014 ACM SIGCOMM Workshop on Capacity Sharing, 2014, ACM, 6 pages.

Yang, et al., "Out-of-Order Transmission for In-Order Arrival Scheduling for Multipath TCP", Advanced Information Networking and Applications Workshops (WAINA), 2014, IEEE, 4 pages.

Dreibholz, et al, "Transmission Scheduling Optimizations for Concurrent Multipath Transfer", Proceedings of the 8th International Workshop on Protocols for Future, Large-Scale and Diverse Network Transports (PFLDNeT), Nov. 2010, vol. 8, 7 pages.

* cited by examiner

FACILITATION OF MULTIPATH TRANSMISSION CONTROL PROTOCOLS

TECHNICAL FIELD

This disclosure relates generally to facilitating wireless network communication over single or multipath connections. More specifically, this disclosure relates to leveraging a cost-benefit analysis to determine the viability of the single or the multipath connection.

BACKGROUND

Hypertext transfer protocol (HTTP) is an application protocol for distributed, collaborative, hypermedia information systems used to exchange or transfer hypertext. HTTP is the foundation of data communication for the World Wide Web. Hypertext is structured text that uses logical links (hyperlinks) between nodes containing text.

HTTP functions as a request-response protocol in the client-server computing model. A web browser, for example, may be the client and an application running on a computer hosting a web site may be the server. The client can submit an HTTP request message to the server. The server, which provides resources such as HTML files and other content, or performs other functions on behalf of the client, can return a response message to the client. The response message can contain completion status information about the request and can also contain requested content in its message body.

A web browser is an example of a user agent (UA). Other types of user agents include the indexing software used by search providers (web crawlers), voice browsers, mobile apps, and other software that accesses, consumes, or displays web content. HTTP is designed to permit intermediate network elements to improve or enable communications between clients and servers. High-traffic websites often benefit from web cache servers that deliver content on behalf of upstream servers to improve response time. Web browsers can cache previously accessed web resources and reuse them when possible to reduce network traffic. HTTP proxy servers at private network boundaries can facilitate communication for clients, without a globally mutable address, by relaying messages with external servers.

Multipath transmission control protocol (MPTCP) connections can allow for usage of multiple paths to maximize resource usage and increase redundancy within the HTTP application protocol. The redundancy offered by MPTCP can enable inverse multiplexing of resources, and thus increase transmission control protocol (TCP) throughput close to the sum of all available link-level channels instead of using a single channel as required by plain TCP.

MPTCP is particularly useful in the context of wireless networks—using both Wi-Fi and a mobile network is a typical use case. In addition to the gains in throughput from inverse multiplexing, links may be added or dropped as a user moves in or out of coverage without disrupting the end-to-end TCP connection. The problem of link-handover is addressed by abstraction in the transport layer, without any special mechanisms at the network or link level. Handover functionality can then be implemented endpoints without requiring special functionality in the subnetworks in accordance with the Internet's end-to-end principle. MPTCP can also bring performance benefits in datacenter environments. In contrast to Ethernet channel bonding using 802.3ad link aggregation, MPTCP can balance a single TCP connection across multiple interfaces.

The above-described background relating to an HTTP application protocol and MPTCP is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
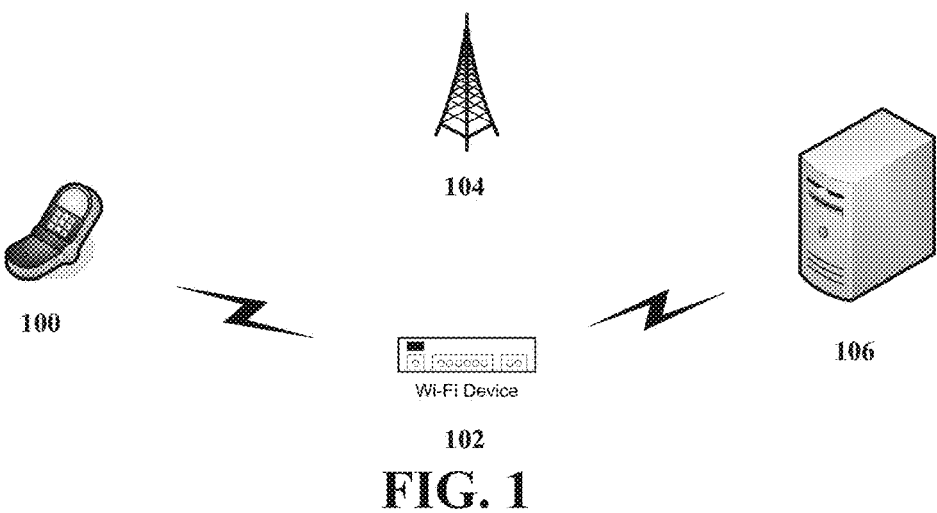
FIG. 1 illustrates an example wireless network comprising a mobile device requesting a resource from a server via a Wi-Fi network device according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate seamless and efficient communication between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate transmission control protocols.

Facilitation of transmission control protocols can be implemented in connection with any type of device with a connection to the communications network such as: a mobile handset, a computer, a handheld device, or the like.

Multiple network interfaces (e.g., Wi-Fi and cellular) on mobile devices can create a unique opportunity for improving web performance. The present disclosure proposes an adaptive multipath solution for mobile web browsing, which can employ multipath connections when the benefits outweigh the cost or some other preference related to web browsing. The benefits can be an improved user experience during web browsing, such as reduced page load time and the number of high-utility resources delivered in the first few seconds. The costs can include additional cellular data usage, which is usually not free, and potential extra energy consumption. The present disclosure can leverage a server push, a standard feature in HTTP/2, to provide an ideal framework to carry out a cost-benefit analysis. It can also determine a practical system design for mobile web browsing over an adaptive multipath transport layer. For instance, the client can send an initial page request to the server over a primary Wi-Fi path, which describes the cost-benefit policies of using multipath. The server can then gather as many resources associated with the page as possible, and then push the resources over either SPTCP or MPTCP, depending on the client's policy. Additionally, for the remaining resources that will not be pushed by the server, the client can either conservatively fetch them over a single path or use the same policy employed by server push.

Most mobile devices are equipped with multiple network interfaces, such as, Wi-Fi and cellular, which can also be leveraged to improve web performance. In the present disclosure, the multiple network interfaces can be exploited to efficiently browse mobile web site over multipath. Accordingly, understanding multipath interplay with regards to web browsing can generate efficiencies in web browsing.

Directly running HTTP/1.1 and HTTP/2 over MPTCP is the most popular way of transparently leveraging multiple interfaces. However, MPTCP provides limited performance gain for HTTP/1.1, because of its many short-lived connections that reduce the usage of the secondary path. This undesirable cross-layer interaction is improved by HTTP/2, which employs a long-lived multiplexing connection, leading to shorter page load time (PLT) when running over MPTCP, compared to over a single path.

However, the performance gain of MPTCP for HTTP/2 may diminish due to several reasons including, but not limited to: when the page size is small, when the network characteristics of a path differs significantly from the other, and/or when the network transfer is not the bottleneck. In the aforementioned scenarios, enabling multipath may increase cellular data usage and energy consumption, while providing little to no quality of experience (QoE) improvement for mobile users. However, multipath can be used adaptively, i.e., only when its offered benefits outweigh its incurred costs. Unfortunately, at the very beginning of loading a page, neither the client nor the server has knowledge of all contents to be transferred, or the cost-benefit analysis associated therewith.

To overcome this limitation, HTTP/2's server push feature can be strategically leveraged to allow early resource discovery and separate the network transfer and local computation, thus making the cost-benefit analysis, a key prerequisite of adaptive multipath, much easier. Based on the above insights, a high-level system design for enabling an adaptive multipath transport layer for mobile web browsing is possible.

Because MPTCP does not interact well with HTTP/1.1, it may have a limited performance gain even for HTTP/1.1. Blindly using multipath causes unnecessary cellular data usage and potentially significant energy drain. It should also be noted that a mobile device's cellular interface is known to be a major battery consumer: 3G radio accounts for $\frac{1}{3}$ to $\frac{1}{2}$ of the overall device energy consumption, and LTE is even more energy hungry. Therefore, multipath should be used in an adaptive manner: either the client or the server needs to predict the costs (in terms of additional cellular data usage and energy consumption) and the benefits (in terms of improved QoE), and enable multipath only if the benefits outweigh the costs. The present disclosure relays a system design for mobile web browsing over an adaptive multipath transport layer in the following manner: (1) the client sends the initial page request, which includes the cost-benefit policies of multipath, to the server over a primary (Wi-Fi, cellular, etc.) path; (2) the server sends web objects to the client over either SPTCP or MPTCP, depending on the client's policy.

Fundamentally, both the cost and benefit are related to how big the to-be-fetched-objects are, and the order and interleaving of the fetching of these objects. HTTP's default "request-response" resource fetching model, which iteratively discovers and fetches resources, can make it difficult to predict the costs and benefits. As a result, at the beginning of loading a page, neither the client nor the server has knowledge of all contents to be fetched. Thus, modifying the page-fetching model is needed to allow early resource discovery, and to enable the client and the server to determine the best delivery strategy.

Server push is the idea of letting the server proactively send resources to clients. Compared to the conventional paradigm of iteratively fetching resources, it can offer three benefits. First, server push can aid in predicting the cost of multipath usage. The ideal usage scenario of server push is, upon the reception of an initial page request, the server gathers most (if not all) resources associated with the page and pushes them in a single bundle to the client. Unlike the conventional iterative resource fetching, network transfer will ideally never be hindered by local computation in server push. Consequently, fetching a web page essentially becomes bulk file downloading with a known size. Then the costs, i.e., the additional data usage and energy consumption incurred by the secondary path, can be estimated through either simulations or theoretical modeling. Note that the cost of additional energy consumption may not always exist. Since MPTCP can reduce the PLT and thus make both radios stay up shorter, it may consume less energy than SPTCP.

Second, server push can also aid in predicting the benefits of multipath usage by separating network transfer and local computation as much as possible. A recent study indicates that after clicking a link, mobile users have a typical tolerance limit of 3 to 5 seconds before most contents of a page are loaded. It suggests that the number of high-utility resources delivered in the first a few seconds is a good metric for quantifying the QoE for web browsing. We can therefore use:

$$B_{MPTCP}(T) - B_{SPTCP}(T) \quad \text{Eqn. (1):}$$

to quantify the QoE improvements brought by MPTCP, where $B_{MPTCP}(T)$ and $B_{SPTCP}(T)$ are the bytes delivered by MPTCP and SPTCP, respectively, in the first T seconds (a pre-defined threshold, e.g., T=3). $B_{MPTCP}(T)$ and $B_{SPTCP}(T)$ can also be estimated by simulations or modeling. In contrast, without server push, the local computation and network transfer are tightly coupled, leading to potentially intermittent traffic patterns and making the estimation of $B_{SPTCP}(T)$ and $B_{MPTCP}(T)$ much more difficult.

Third, server push can improve cellular energy efficiency, as a bundled push maximizes bandwidth utilization and minimizes the "radio-on-but-idle" time. Without server push, the potentially intermittent traffic patterns force the cellular radio to stay at the high-power state for a longer period. This occurs in both SPTCP (if cellular is used) and MPTCP. For example, a client device can send an initial page request to the server device over a primary Wi-Fi path. In the request, the client device can describe cost-benefit policies of leveraging multipath. A policy can be, for example, multipath should be used only if at least 200 KB of data will be transferred. The server device can gather as many resources associated with the page as possible, and then pushes them over either SPTCP or MPTCP, depending on the client's policy. The server can be responsible for establishing a secondary path if it decides to use MPTCP. For the remaining resources that will not be pushed by the server, the client device can either conservatively fetch them over a single path, or use the same policy employed by server push. These residual resources may be none or very few and would incur a limited impact on the user's experience (e.g., they may be advertisements and/or periodic background pings).

It should also be noted that an artificial intelligence (AI) component can facilitate automating one or more features in accordance with the disclosed aspects. A memory and a processor 104 as well as other components can include functionality with regard to the figures. The disclosed aspects in connection with the cost-benefit analysis predication can employ various AI-based schemes for carrying out various aspects thereof. For example, a process for determining a cost-benefit can be facilitated with an example automatic classifier system and process. In another example, a process for penalizing one transfer control protocol (i.e.: SPTCP) while preferring another transfer control protocol (i.e.: MPTCP) can be facilitated with the example automatic classifier system and process.

An example classifier can be a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be an output power reduction value. In another example, the attributes can be a frequency band, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving web site request data related to a request for a web site made by a mobile device, and receiving preference data associated with sending web site data related to the web site request data via a Wi-Fi connection of the network device or via a cellular network connection of the network device. Resource data associated with sending the web site data via the Wi-Fi connection of the network device or via the cellular network connection of the network device can also be received. Thereafter, the preference data and the resource data can be analyzed, and in response to a condition associated with the analyzed data being determined to have been satisfied, the web site data can be sent.

According to another embodiment, a system can facilitate, receiving web site request data, related to a request for a web site made by a mobile device, via a Wi-Fi connection of the mobile device, and receiving preference data, associated with sending web site data related to the web site request data, via the Wi-Fi connection of the mobile device. The system can also facilitate collecting resource data associated with sending the web site data to the mobile device. Consequently, as a result of analyzing the preference data and the resource data, first web site data of the web site data can be transmitted.

According to yet another embodiment, described herein is a machine-readable storage medium that can perform the operations comprising obtaining web site request data, related to a request for a web site made by a mobile device, via a Wi-Fi connection of the mobile device, and receiving preference data, associated with sending web site data related to the web site request data, via the Wi-Fi connection of the mobile device. The preference data can comprise a first power associated with the mobile device and a radio state associated with the mobile device. The machine-readable storage medium can also generate resource data associated with sending the web site data to the mobile device, and analyzing the preference data and the resource data, resulting in analyzed data. Thus, in response to a condition associated with the analyzed data being determined to have been satisfied, first web site data of the web site data can be transmitted.

These and other embodiments or implementations are described in more detail below with reference to the drawings.

Referring now to FIG. 1, illustrated is an example wireless network comprising a mobile device requesting a resource from a server device via a Wi-Fi network device according to one or more embodiments. At time T1, a mobile device 100 can request a web site resource from a server device 106 via a Wi-Fi device 102. Prior to the request, the Wi-Fi device 102 can be set as the primary device. Because the Wi-Fi device 102 is set as the primary device, the initial resource request can be sent via the Wi-Fi device 102 instead of the cellular network device 104. It should be noted that in an alternate embodiment the cellular network device 104 can be set to be the primary device, which means that initial communication from the mobile device 100 to the server device 106 can take place via the cellular network device 104. In yet a further embodiment, initial communication to the server device 106 from the mobile device 100 can take place via the cellular network device 104 and the Wi-Fi device 102 if the benefit of doing so outweighs the costs of leveraging the cellular network device 104 in conjunction with the Wi-Fi device 102.

Figure 2:
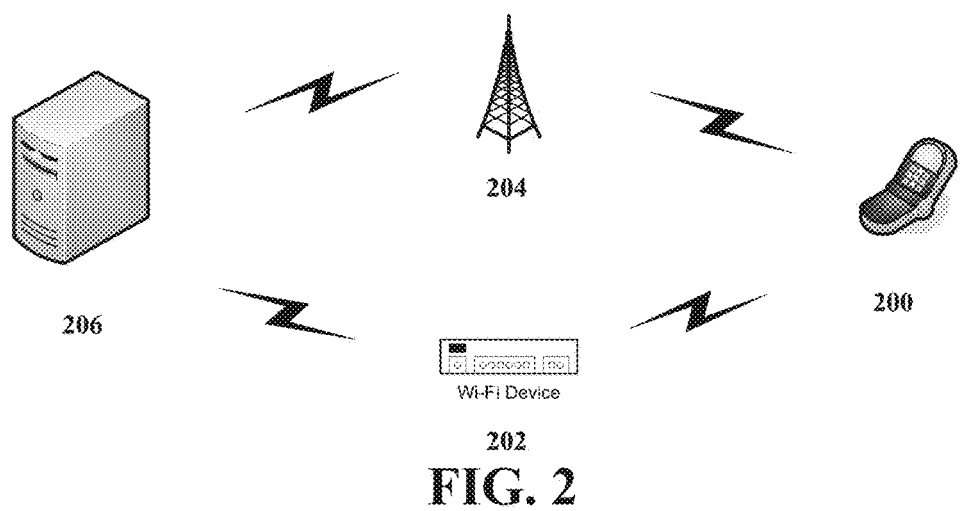
FIG. 2 illustrates an example wireless network server device sending resource data to a mobile device via an MPTCP according to one or more embodiments.

Referring now to FIG. 2, illustrated is an example wireless network server device sending resource data to a mobile device via an MPTCP according to one or more embodiments. At time T2, the server device 206 can send requested web site data to the mobile device 200 via the cellular network device 204 and the Wi-Fi device 202. The server device 206 can make the determination to send web site resource data via multiple paths based on a cost-benefit analysis. The cost-benefit analysis can be performed by the server device 206 and/or the mobile device 200. In the current scenario, the server sends the resource data via multiple paths in response to a determination that it is more cost effective to send the resource data via the cellular network device 204 and the Wi-Fi device 202 than it is to send the resource data via the cellular network device 204 or the Wi-Fi device 202

Figure 3:
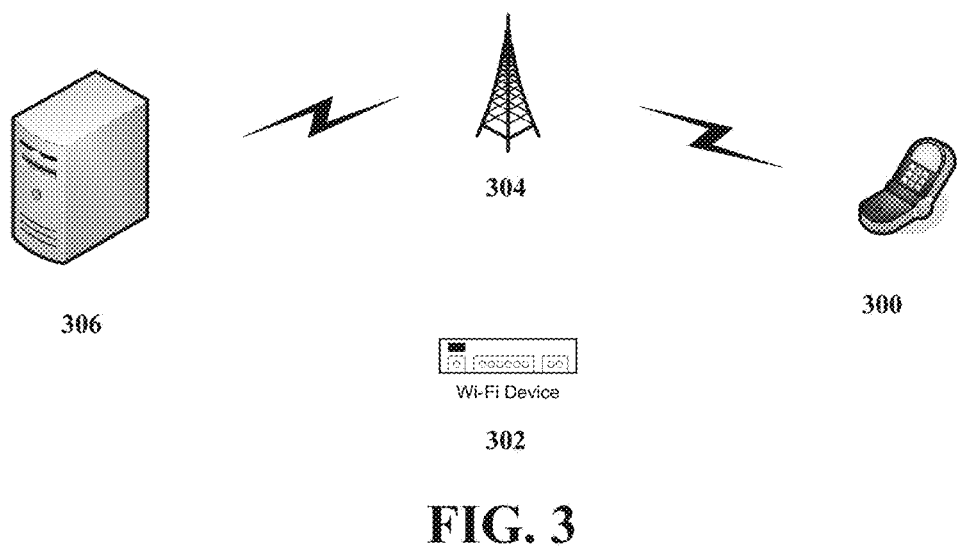
FIG. 3 illustrates an example wireless network comprising a server device sending resource data to a mobile device via an SPTCP after terminating sending the resource data via an MPTCP according to one or more embodiments.

Referring now to FIG. 3, illustrated is an example wireless network comprising a server device sending resource data to a mobile device via an SPTCP after terminating sending the resource data via an MPTCP according to one or more embodiments. At time T3, the server device 306 has determined that it is more cost effective to send the resource data to the mobile device 300 via a single path over the cellular network device 304. Therefore, the server device 306 has terminated communication with the Wi-Fi device 302 based on a cost-benefit analysis wherein the benefit of only sending the resource data via the cellular network device 304 outweighs the cost of sending the resource data via the cellular network device 304.

It should also be noted that the system can determine to use a single path connection as represented by FIG. 3 or a multipath connection as represented by FIG. 2 depending upon the outcome of the cost-benefit analysis. Therefore, the process as represented by FIG. 2 does not have to come before the process as represented by FIG. 3. Consequently, the determination to leverage a single path data push (referenced by FIG. 3) or a multipath data push (referenced by FIG. 2) is dependent up the cost benefit analysis.

Figure 4:
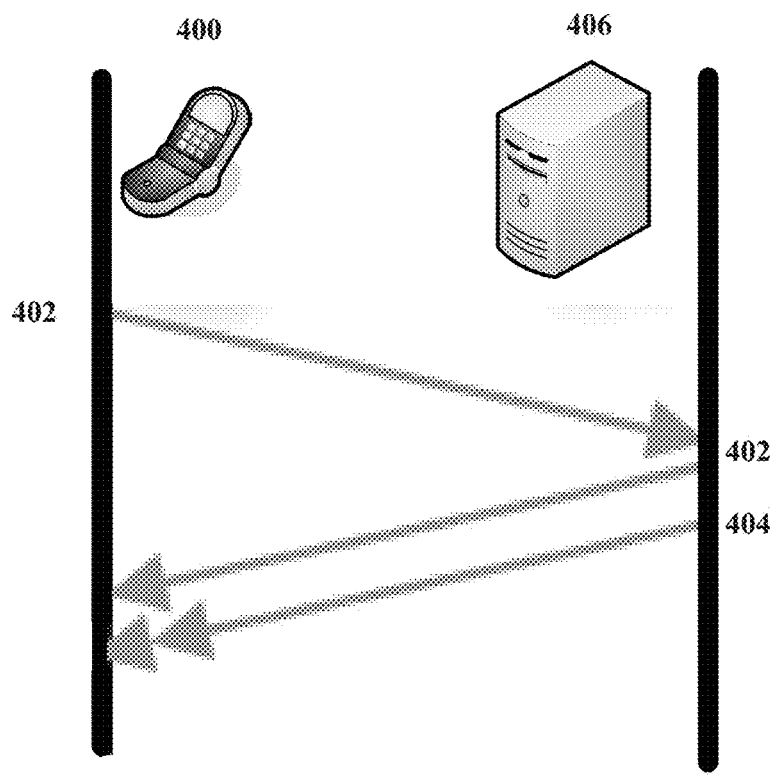
FIG. 4 illustrates an example wireless network comprising a mobile device resource request and an HTTP server push according to one or more embodiments.

Referring now to FIG. 4, illustrated is an example wireless network comprising a mobile device resource request and an HTTP server push according to one or more embodiments. A mobile device 400 can send a web site page request 402 to a server device 406 via a single path. The single path can take place over a Wi-Fi device or a cellular network device. The web site page request 402 can comprise page resource data for loading the page. The page resource data can be cacheable so that the page can be loaded from a local cache when the mobile device 400 needs it. The server device 406 can send a response 404 to the mobile device 400. The response 404 can comprise push data related to the web site page. The response 404 can be sent via a multipath via the Wi-Fi device and the cellular network device simultaneously. The determination to send via an SMTCP or a MPTCP can be based on a cost-benefit analysis determined by the mobile device 400 and/or the server device 406.

To facilitate sending of the push data, the server device 406 can send a push promise frame on the existing web site page request 402 stream. The push promise stream can notify the mobile device 400 that the server device 406 can create a new stream for pushing data by including a new stream ID. The push promise frame can also comprise header data related to a resource to be pushed.

Figure 5:
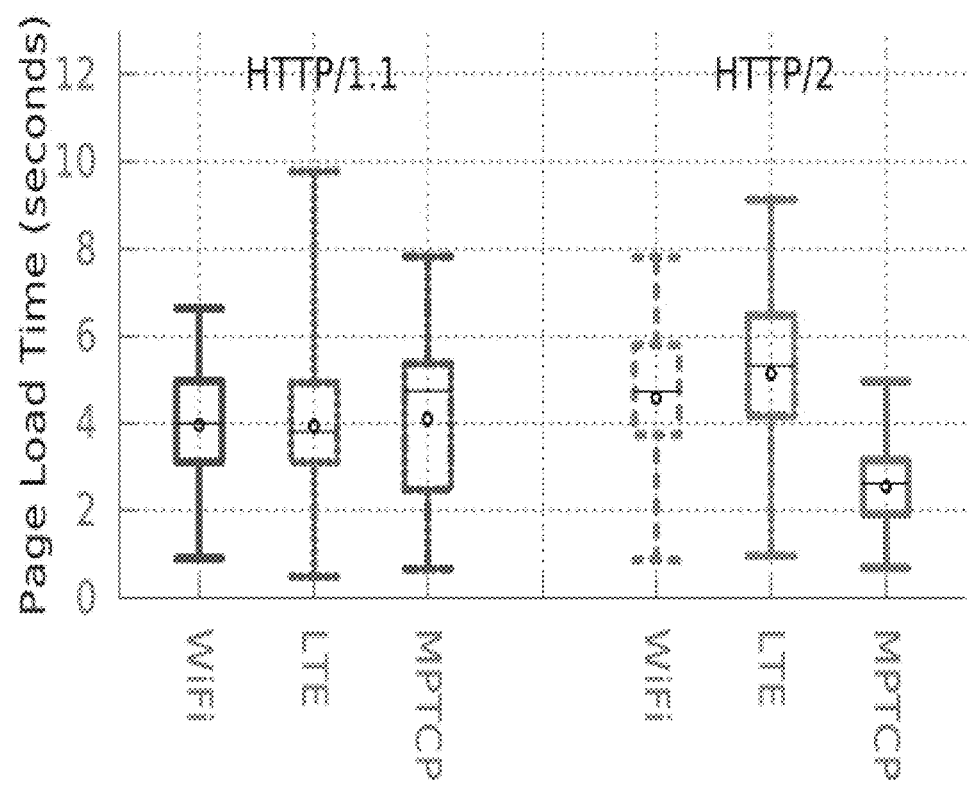
FIG. 5 illustrates a box plot graph of an example page load time of HTTP/1.1 vs. HTTP/2 over single path and multipath connections according to one or more embodiments.

Referring now to FIG. 5, illustrated is a box plot graph of an example page load time of HTTP/1.1 vs. HTTP/2 over single path and multipath connections according to one or more embodiments. HTTP/1.1 is the de facto web protocol used by millions of web servers today. As the successor of HTTP/1.1, HTTP/2 can provide new features such as multiplexing, binary protocol format, header compression, and server push. The left side of FIG. 5 compares PLT of HTTP/1.1 over SPTCP and MPTCP for 24 popular commercial websites, whose categories include: news, video, classified ads, shopping, online radio, search, movie, image sharing, sports, technology, weather, real estate, knowledge base, airline, government, travel, university, etc. Since Wi-Fi is usually free and incurs less energy footprint on mobile devices, it can be selected as the primary path to initiate MPTCP connections, and use LTE as the secondary connection. The results indicate that MPTCP often does not help improve (and sometimes may even hurt) the performance of HTTP/1.1. This can be attributed to the fact that in an HTTP/1.1's paradigm, the browsers can issue a large number of short-lived connections, many of which terminate before the secondary path's handshake is completed. This can significantly reduce the chance of using the secondary path. During MPTCP experiments, only 49.80% of the connections actually used LTE, which can stem from a fundamental limitation of HTTP/1.1 that allows only one outstanding request per TCP connection. Therefore, the only way for HTTP/1.1 to increase its network throughput is to go parallel (i.e., using multiple concurrent connections that are short-lived).

As MPTCP starts to establish the secondary subflow, after finishing the handshake of the primary subflow, the issue of under-utilizing the secondary path can potentially be mitigated by making MPTCP simultaneously perform both subflows' handshakes. However, doing so may increase mobile devices' energy consumption since the LTE subflow will always perform handshake even when it does not carry any data payload for short flows.

Repeating the page load for HTTP/2, as shown in the right side of FIG. 5, MPTCP can bring significant performance improvement to HTTP/2, with the average reductions of PLT across sites ranging from 18.22% to 57.19%, compared to the best single-path PLT among Wi-Fi and cellular. Unlike HTTP/1.1, HTTP/2 can support multiple outstanding requests by multiplexing many objects onto a single connection, thus creating sufficient opportunities to utilize both paths. Consequently, MPTCP for HTTP/2 can increase the flow duration, making all connections use the secondary path.

Figure 6:
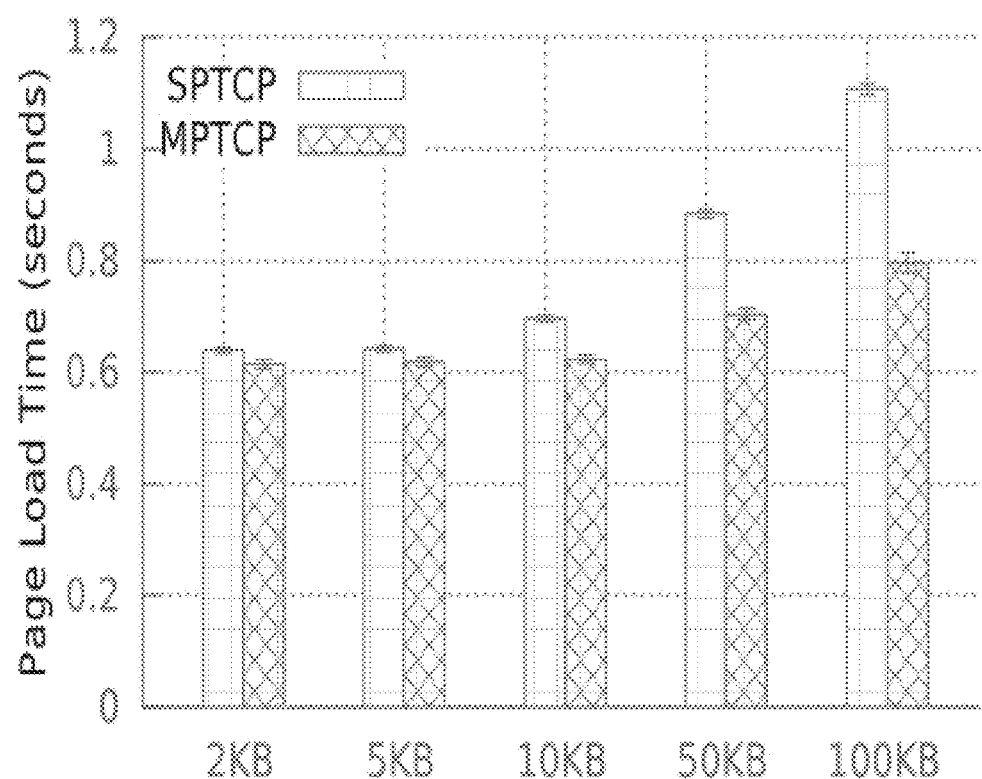
FIG. 6 illustrates a page load time graph for small pages over single (single path transmission control protocol) and MPTCP connections according to one or more embodiments.

Referring now to FIG. 6, illustrated is a page load time graph for small pages over SPTCP and MPTCP connections according to one or more embodiments. When the page size is small or a warm-cache loading is performed, the page fetching may finish right after the secondary subflow is established. FIG. 6 shows the results for synthetic pages with sizes ranging from 2 kilobytes (KB) to 100 KB. As the page size becomes smaller, the PLT difference between SPTCP and MPTCP diminishes. Prior studies have show the median size of warm-cache loading of a mobile page can be around 50 KB. In essence, the larger the page size, the more effective using MPTCP connections can be. Therefore, simulated or model cost-benefit analysis can leverage a known or predicted page size to determine whether SPTCP or MPTCP is more efficient.

Figure 7:
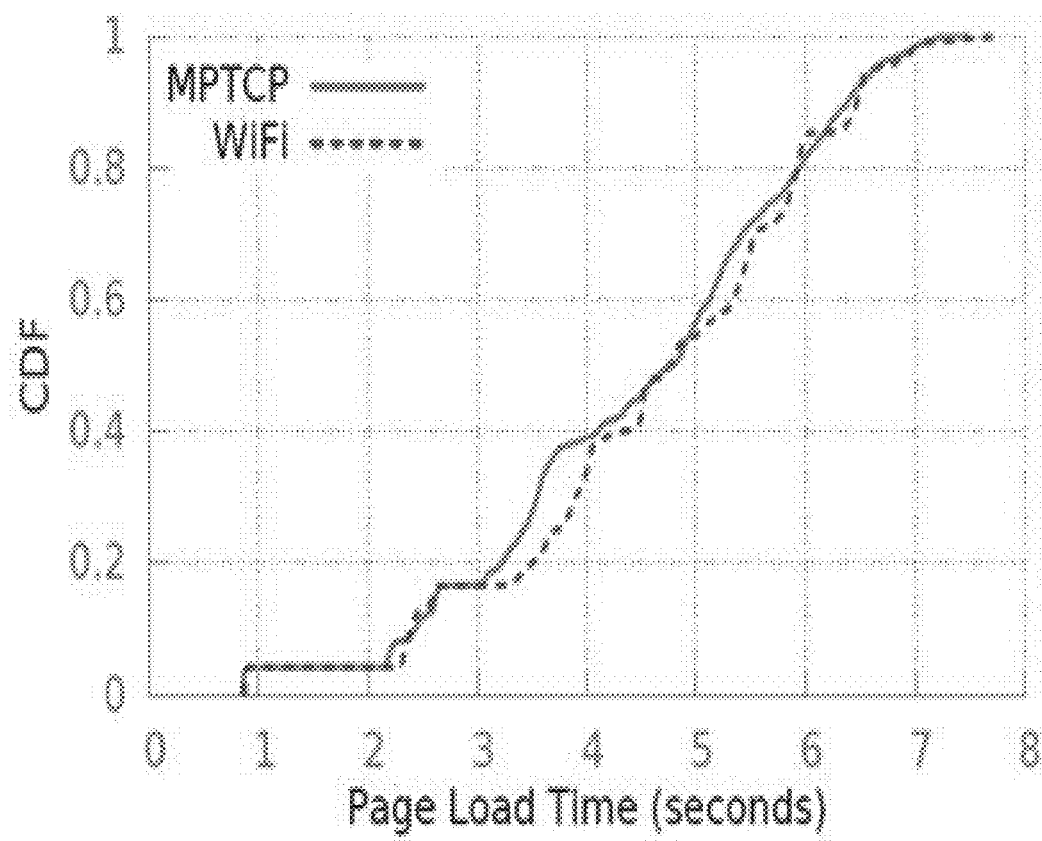
FIG. 7 illustrates a cumulative distribution function (CDF) graph of page load time over SPTCP (Wi-Fi) vs. MPTCP (Wi-Fi+cellular) connections according to one or more embodiments.

Referring now to FIG. 7, illustrated is a cumulative distribution function (CDF) graph of page load time over SPTCP (Wi-Fi) vs. MPTCP (Wi-Fi+cellular) connections according to one or more embodiments. When the secondary path has a higher latency and lower throughput than the primary path, the MPTCP's default scheduler can route most packets to the primary path. As shown in FIG. 7, measuring the page load time of MPTCP using a Wi-Fi link and a 3G link shows that MPTCP and SPTCP over Wi-Fi yield very similar performances.

Figure 8:
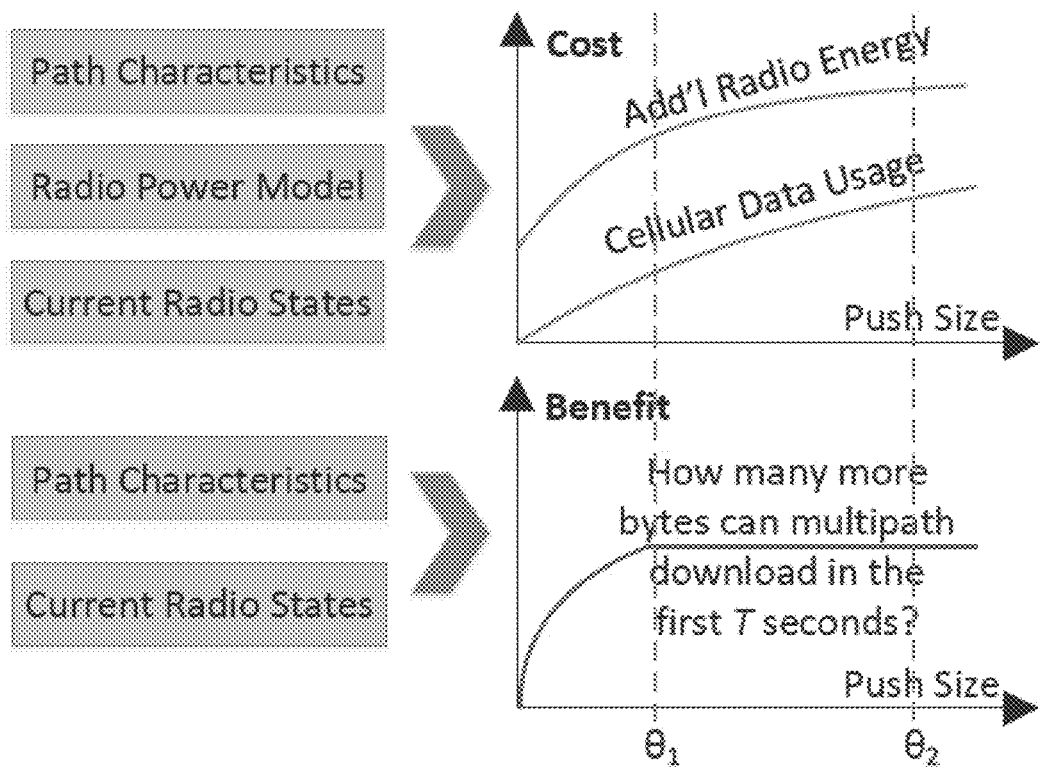
FIG. 8 illustrates an example cost-benefit analysis graph according to one or more embodiments.

Referring now to FIG. 8, illustrated is an example cost-benefit analysis graph according to one or more embodiments. Prior to sending a page request, the client (i.e.: mobile device) can derive cost functions of additional cellular data usage and energy consumption (if any, compared to SPTCP over Wi-Fi). Several factors can affect the costs: both paths' characteristics (latency, bandwidth, loss, etc.), the power models of both interfaces, and their current radio states (turning on the radios costs energy). Such information can be obtained from the client (e.g., radio resource control (RRC) states and signal strength) and/or by lightweight passive measurement on the client. The client can also derive a benefit function:

$$\text{Benefit} = B_{MPTCP}(T) - B_{SPTCP}(T), \quad \text{Eqn. (1)}$$

which is the additional bytes MPTCP can deliver in the first T seconds compared to SPTCP, under the current network conditions and radio states. With external factors (network conditions, power models, and radio states) known, the only variable in both the cost and benefit functions is the size of pushed resources, which can be derived by modeling, simulations, or emulations.

Subsequently, based on the benefit function and/or user-specified high-level requirements, the client can generate a compact cost-benefit policy and send it to the server. The simplest policy can comprise a single threshold $\theta_1$, dictating the server to use multipath only when the push size is larger than $\theta_1$. If the client realizes that the energy and/or monetary cost will exceed $\theta_1$, then the client can send another threshold $\theta_2$, asking the server to limit the cellular data usage. Alternatively, if the server realizes that sending the web site resource will exceed the energy and/or monetary cost associated $\theta_1$ the server can generate a second threshold $\theta_2$ or ask the client to send another threshold $\theta_2$. The server can then simply follow the policy and use SPTCP or MPTCP accordingly.

Figure 9:
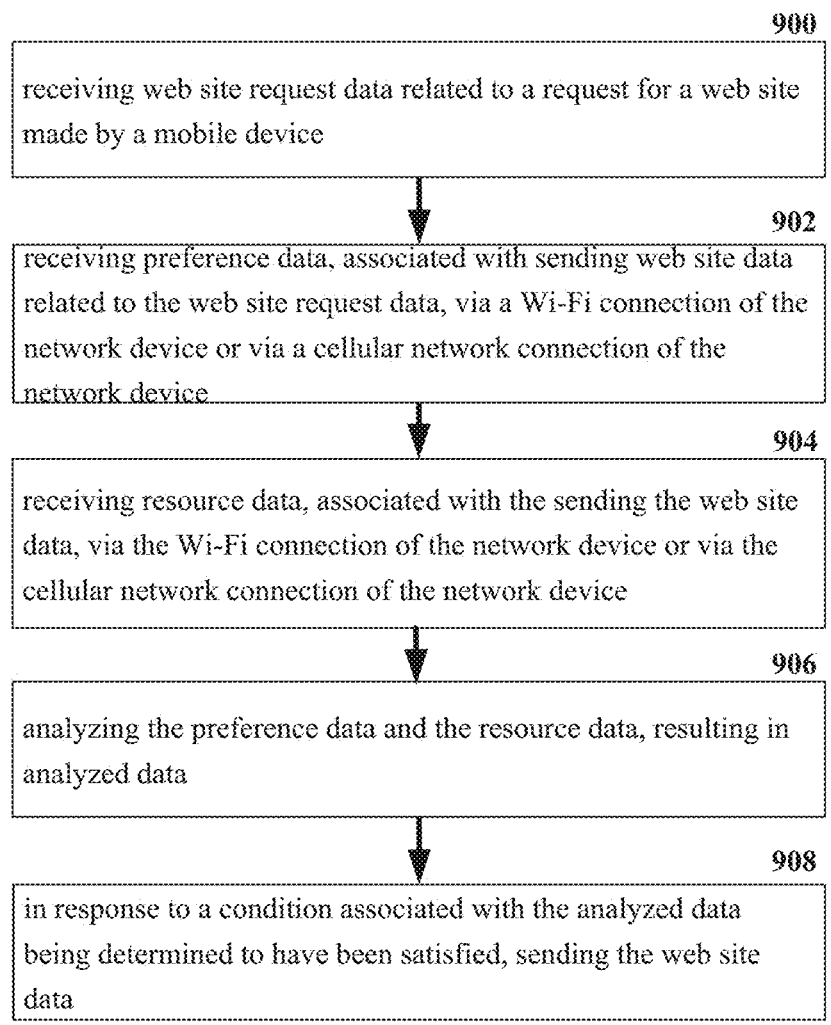
FIG. 9 illustrates an example schematic system block diagram for analyzing cost-benefit data and sending resources based on a condition being satisfied according to one or more embodiments.

Referring now to FIG. 9, illustrated is an example schematic system block diagram for analyzing cost-benefit data and sending resources based on a condition being satisfied according to one or more embodiments. At element 900, web site request data related to a request for a web site made by a mobile device can be received. At element 902, preference data associated with sending web site data related to the web site request data can be received via a Wi-Fi connection of the network device or via a cellular network connection of the network device. The cost data can comprise a preference associated with using the cellular network for data transmission. Whether the web site request data is received via the Wi-Fi connection of the network device or via the cellular network connection of the network device can be based on which route (Wi-Fi or cellular) is labeled as the primary route.

Resource data associated with the sending the web site data via the Wi-Fi connection of the network device or via the cellular network connection of the network device can be received at element 904. The resource data can also comprise benefit data such as energy consumption, cellular data cost, RRC data, etc. At element 906, the preference data and the resource data can be analyzed resulting in analyzed data. The analyzed data can comprise a cost-resource analysis. In response to a condition associated with the analyzed data being determined to have been satisfied, the web site data can be sent at element 908. For instance, for a specific web site request in conjunction with the RRC parameters of the mobile device, if it is more cost effective to use the MPTCP instead of SPTCP, then a server device can utilize the MPTCP as indicated by the mobile device's cost-benefit analysis.

Figure 10:
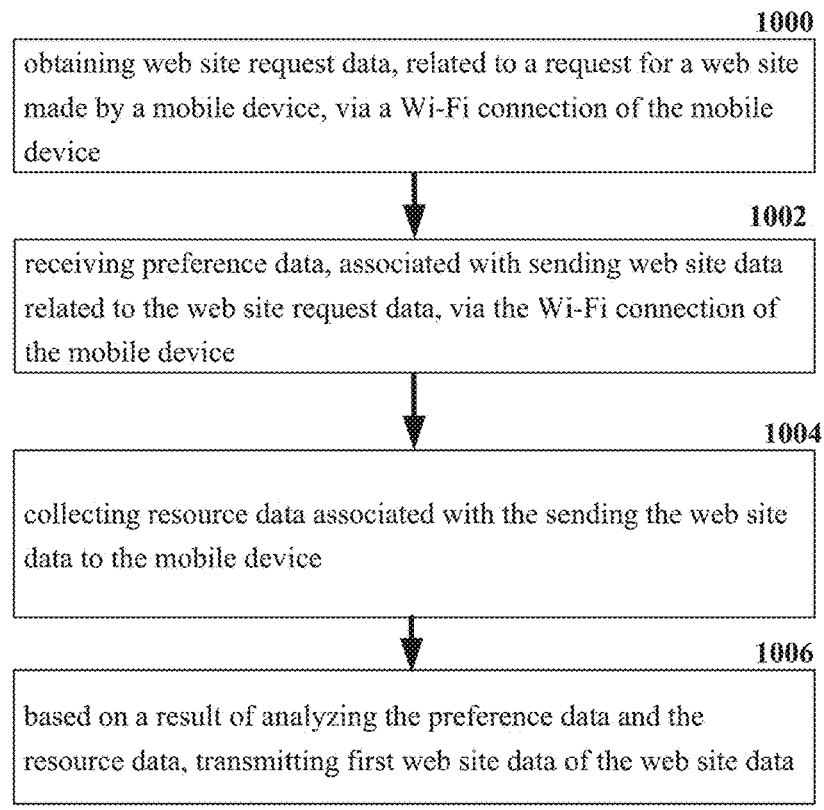
FIG. 10 illustrates an example schematic system block diagram for analyzing and transmitting cost-benefit data to affect a path outcome according to one or more embodiments.

Referring now to FIG. 10, illustrated is an example schematic system block diagram for analyzing and transmitting cost-benefit data to affect a path outcome according to one or more embodiments. At element 1000, web site request data related to a request for a web site made by a mobile device via a Wi-Fi connection of the mobile device can be obtained. The Wi-Fi connection can be the primary connection, but is should be noted that a cellular connection can also be the primary connection. Whether the web site request data is received via the Wi-Fi connection of the network device or via the cellular network connection of the network device can be based on which route (Wi-Fi or cellular) is labeled as the primary route.

At element 1002, preference data associated with sending web site data related to the web site request data via the Wi-Fi connection of the mobile device can be received. The preference data can comprise a preference associated with using the cellular network for data transmission. Additionally, at element 1004, resource data associated with the sending the web site data to the mobile device can be collected. The resource data can also comprise benefit data such as energy consumption, cellular data cost, RRC data, etc. Based on a result of analyzing the preference data and the resource data, first web site data of the web site data can be transmitted at element 1006. The analyzed preference data can comprise a cost-resource analysis. For instance, for a specific web site request in conjunction with the RRC parameters of the mobile device, if it is more cost effective to use the MPTCP instead of SPTCP, then a server device can utilize the MPTCP as indicated by the mobile device.

Figure 11:
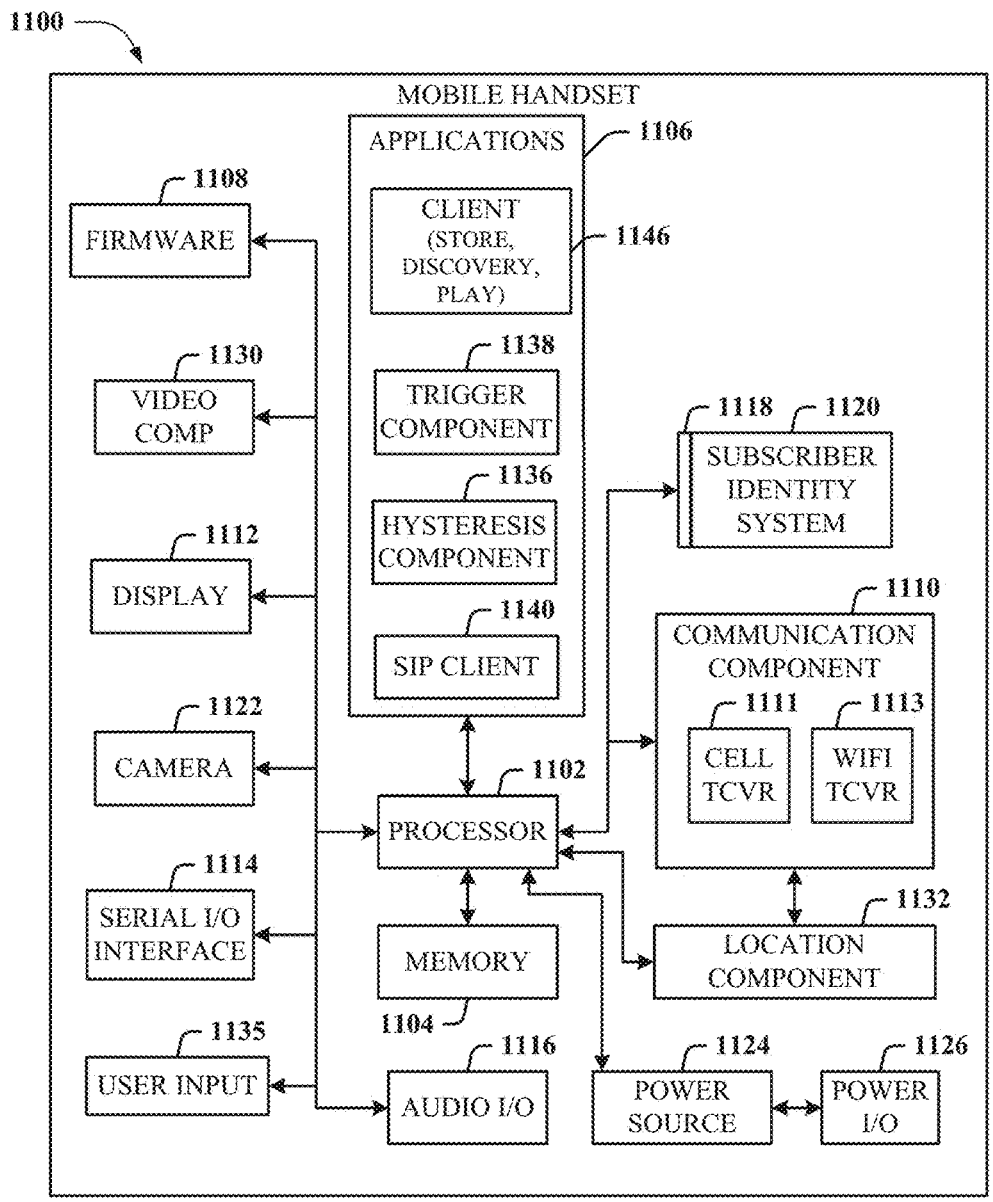
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
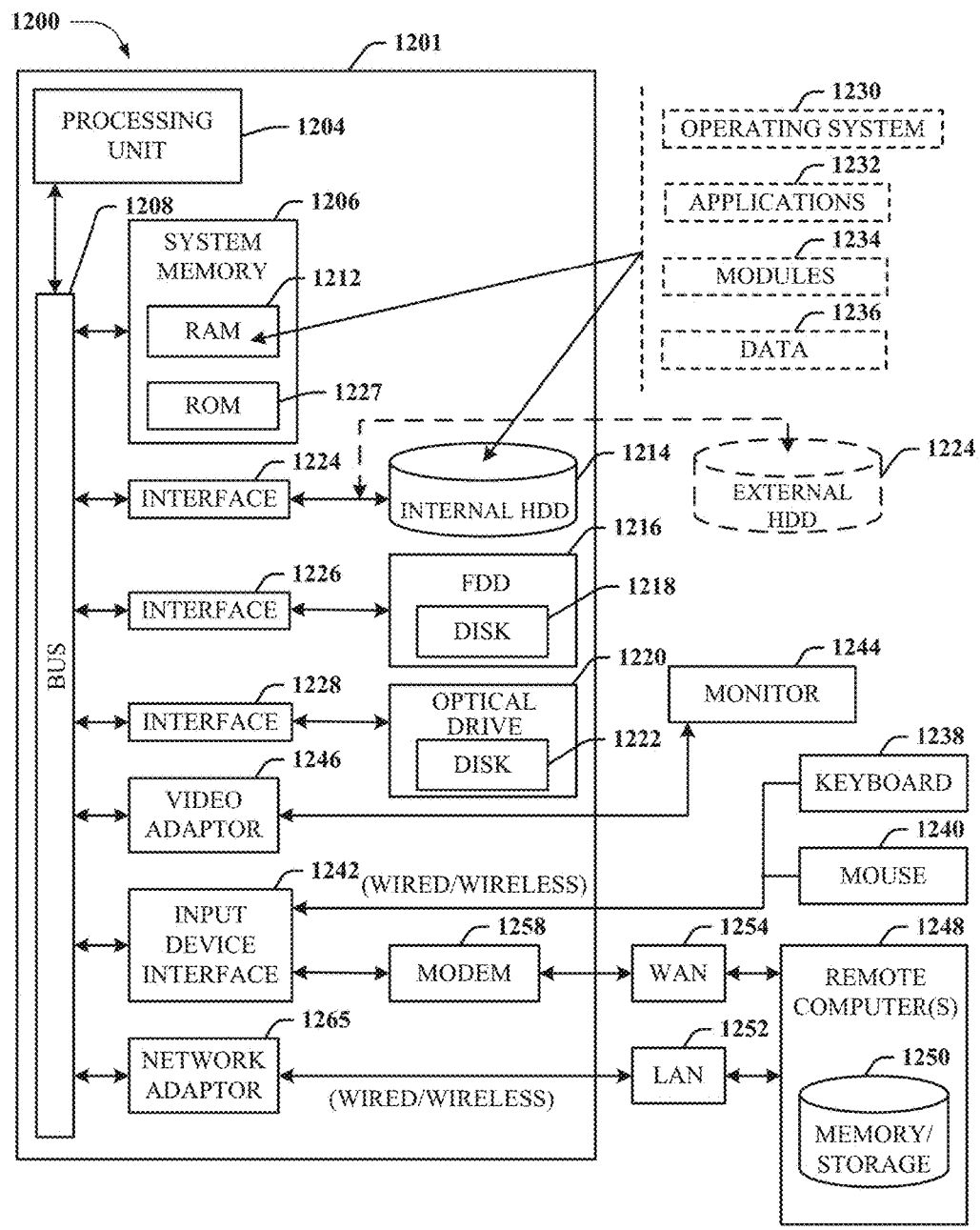
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 GHz (802.11b/g) and 5 GHz (802.11a) radio bands, or with products that contain both bands (dual band), so the networks can provide real-world performance similar to the basic 10 BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
receiving, by a network device comprising a processor, web site request data related to a request for a web site made by a mobile device;
receiving, by the network device, preference data associated with sending web site data related to the web site request data via a Wi-Fi connection of the network device or via a cellular network connection of the network device, wherein the preference data comprises benefit data related to a number of bytes that are deliverable via the Wi-Fi connection of the mobile device and the cellular network connection of the mobile device;

receiving, by the network device, resource data associated with the sending the web site data via the Wi-Fi connection of the network device or via the cellular network connection of the network device;

analyzing, by the network device, the preference data and the resource data, resulting in analyzed data; and in response to a condition associated with the analyzed data being determined to have been satisfied, sending, by the network device, the web site data.

2. The method of claim 1, wherein the condition comprises a comparison of the preference data to the resource data, resulting in compared data.

3. The method of claim 2, wherein the sending the web site data comprises, based on the compared data, sending the web site data via the Wi-Fi connection of the network device.

4. The method of claim 1, wherein the preference data is related to a size of a data packet associated with the sending the web site data.

5. The method of claim 1, wherein the preference data is related to an order of data packets associated with the sending the web site data.

6. The method of claim 1, wherein the preference data is estimated via a cost data simulation model.

7. The method of claim 6, wherein the cost data simulation model comprises first cost data associated with the sending the web site data via the Wi-Fi connection of the network device and second cost data associated with the sending the web site data via the cellular network connection of the network device.

8. A system, comprising:
a processor; and
a memory that stores executable instructions that, when executed by the processor, facilitate performance of operations, comprising:
receiving web site request data, related to a request for a web site made by a mobile device, via a Wi-Fi connection of the mobile device;
receiving preference data, associated with sending web site data related to the web site request data, via the Wi-Fi connection of the mobile device, wherein the preference data comprises benefit data related to a number of bytes that are deliverable via the Wi-Fi connection of the mobile device and a cellular connection of the mobile device;
collecting resource data associated with the sending the web site data to the mobile device; and
based on a result of analyzing the preference data and the resource data, transmitting first web site data of the web site data.

9. The system of claim 8, wherein the transmitting comprises transmitting the first web site data via the Wi-Fi connection of the mobile device and the cellular connection of the mobile device.

10. The system of claim 9, wherein the result is associated with a minimum packet data transfer of the web site data to the mobile device.

11. The system of claim 10, wherein the operations further comprise:

transmitting second web site data, of the web site data, via the Wi-Fi connection of the mobile device.

12. The system of claim 11, wherein the operations further comprise:
in response to a condition associated with the Wi-Fi connection being determined to have been satisfied, transmitting third web site data of the web site data, via the Wi-Fi connection of the mobile device and the cellular connection of the mobile device.

13. The system of claim 12, wherein the condition is related to a latency associated with the Wi-Fi connection.

14. The system of claim 9, wherein the result is associated with a maximum packet data transfer of the web site data to the mobile device.

15. A non-transitory machine-readable storage medium, comprising executable instructions that, when executed by a processor, facilitate performance of operations, comprising:
obtaining web site request data, related to a request for a web site made by a mobile device, via a Wi-Fi connection of the mobile device;
receiving preference data, associated with sending web site data related to the web site request data, via the Wi-Fi connection of the mobile device, wherein the preference data comprises:
benefit data related to a number of bytes that are deliverable via the Wi-Fi connection of the mobile device and a cellular connection of the mobile device;
a first power associated with the mobile device; and
a radio state associated with the mobile device;
generating resource data associated with the sending the web site data to the mobile device;
analyzing the preference data and the resource data, resulting in analyzed data; and
in response to a condition associated with the analyzed data being determined to have been satisfied, transmitting first web site data of the web site data.

16. The non-transitory machine-readable storage medium of claim 15, wherein the analyzing the preference data comprises analyzing a second power associated with a server device.

17. The non-transitory machine-readable storage medium of claim 15, wherein the preference data comprises latency data representative of a latency associated with the Wi-Fi connection of the mobile device.

18. The non-transitory machine-readable storage medium of claim 15, wherein the preference data comprises latency data representative of a latency associated with the cellular connection of the mobile device.

19. The non-transitory machine-readable storage medium of claim 15, wherein the preference data is related to a size of a data packet associated with the sending the web site data.

20. The non-transitory machine-readable storage medium of claim 15, wherein the number of bytes is a first number of bytes, and wherein the benefit data comprises a relationship between the first number of bytes that are deliverable via the Wi-Fi connection of the mobile device and the cellular connection of the mobile device, and a second number of bytes that are deliverable via the Wi-Fi connection of the mobile device or the cellular connection of the mobile device.

* * * * *